(12) United States Patent
Landert et al.

(10) Patent No.: US 7,310,220 B2
(45) Date of Patent: Dec. 18, 2007

(54) HIGH VOLTAGE OUTDOOR SUBSTATION

(75) Inventors: Hans-Peter Landert, Uster (CH); Dieter Fuechsle, Endingen (CH)

(73) Assignee: ABB Technology AG, Zurich (CH)

( * ) Notice: Subject to any disclaimer, the term of this patent is extended or adjusted under 35 U.S.C. 154(b) by 351 days.

(21) Appl. No.: 11/076,888

(22) Filed: Mar. 11, 2005

(65) Prior Publication Data

US 2005/0213288 A1    Sep. 29, 2005

(30) Foreign Application Priority Data

Mar. 25, 2004  (EP)  ................... 04405185

(51) Int. Cl.
*H02B 5/04*    (2006.01)
(52) U.S. Cl. ..................... 361/602; 361/605
(58) Field of Classification Search ............... 361/611, 361/612, 618, 605, 602, 601
See application file for complete search history.

(56) References Cited

U.S. PATENT DOCUMENTS

| 4,342,067 | A  | * | 7/1982 | Thuries et al. .............. 361/602 |
| 6,233,137 | B1 | * | 5/2001 | Kolos et al. ................. 361/603 |
| 6,538,875 | B2 | * | 3/2003 | Marmonier et al. ........ 361/602 |
| 6,771,489 | B2 | * | 8/2004 | Marmonier et al. ........ 361/604 |
| 2004/0027791 | A1 | | 2/2004 | Marmonier et al. |
| 2004/0037025 | A1 | | 2/2004 | Abe |

FOREIGN PATENT DOCUMENTS

| DE | 29 29 054 A1 | 1/1980 |
| DE | 199 04 402 A1 | 6/2000 |
| DE | 100 11 888 A1 | 10/2001 |
| EP | 1 168 551 A1 | 1/2002 |

OTHER PUBLICATIONS

"$SF_6$-Gas-isolierte Schaltanlagen (GIS) Typ ELK" (SF6-Gas-insulated substations), pp. 14-15, Druckschrift Nr. CH-HS 1215 87 D, Ersetzt CH-A 161 312 D, BBC Brown Boveri AG, Baden, Switzerland.

* cited by examiner

*Primary Examiner*—Michael C. Zarroli
(74) *Attorney, Agent, or Firm*—Buchanan Ingersoll & Rooney PC

(57) ABSTRACT

The substation has at least one outdoor busbar (11, 12) as well as at least two switch bays which can be connected to the busbar and at least one encapsulated, gas-insulated, arrangement of switchgear modules (30) which is arranged in one of the switch bays. This switchgear arrangement contains at least one disconnector module (DS) and at least one circuit breaker module (CB). An installation module (MM) is arranged between the disconnector module and the circuit breaker module and allows lateral removal of at least one of the two switchgear modules (DS, CB).

This substation is distinguished by high availability, since each of the most severely loaded components of the encapsulated switchgear arrangement, that is to say the disconnector module and the circuit breaker module, can be removed from the substation by lateral removal without having to change the position of the other components. Once the removed component has been replaced, the complete substation availability can be reproduced quickly and at low cost.

14 Claims, 5 Drawing Sheets

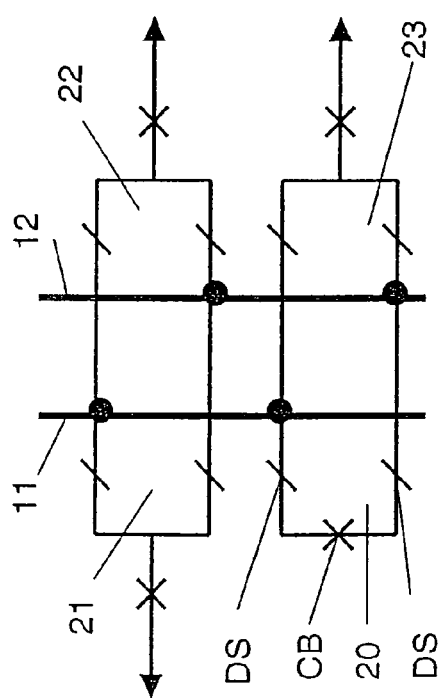
Fig.1
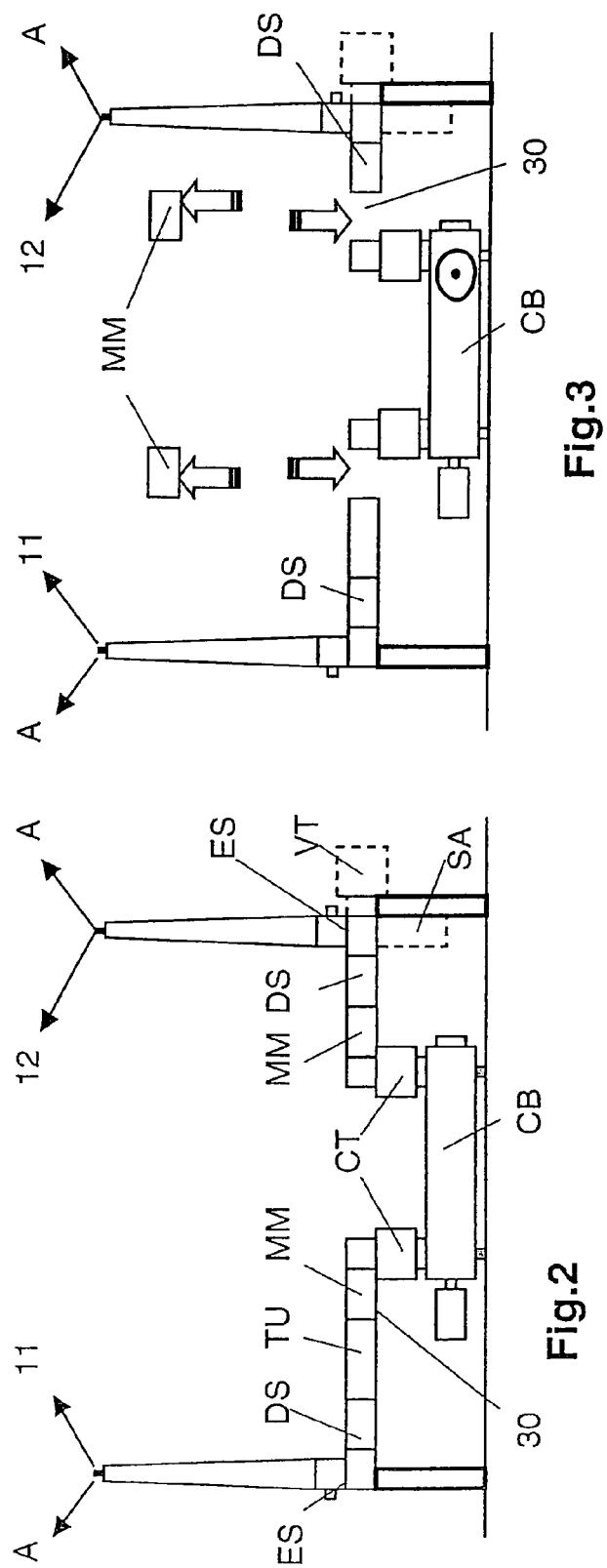
Fig.2
Fig.3

HIGH VOLTAGE OUTDOOR SUBSTATION

TECHNICAL FIELD

The invention is based on a high-voltage substation as claimed in the precharacterizing clause of patent claim 1. This substation has at least one outdoor busbar and at least two switch bays or substation sections which can be connected to the busbar. An encapsulated, gas-insulated, arrangement of switchgear modules is provided in one of the switch bays and contains at least one module in the form of an isolator or disconnector, and at least one module in the form of a circuit breaker.

A substation such as this, which is frequently referred to as a hybrid substation, has a terminating structure which covers switch bays and on which an outdoor busbar system as well as branch circuits, such as feeders and load outgoers are generally supported. At least one of the switch bays generally contains a gas-insulated arrangement of switchgear modules which is encapsulated on a single-phase or polyphase basis and which, depending on the configuration, ensures a more or less high-availability connection between the busbar system and the branch circuits, or between two of the busbars in the busbar system.

The modules of the encapsulated switchgear arrangement are filled with an insulating gas, for example nitrogen, air, sulfurhexafluoride ($SF_6$) on their own or as a mixture, at a pressure of up to several bar, and are typically loaded with high voltages of more than 100 kV during operation of the substation. Typical modules are in the form of circuit breakers, disconnectors, grounding switches, combined disconnectors and grounding switches, current and/or voltage measurement equipment or current or voltage limiters.

The substation of the type mentioned initially is distinguished in comparison to exclusively outdoor substations by high availability over a long time period and by a small space requirement, by virtue of the encapsulated switchgear arrangement.

PRIOR ART

In the precharacterizing clause, the invention refers to a prior art of substations as described, for example, in DE 29 29 054 A1, DE 100 11 888 A1 or US 2004/0027791 A1. The substations which are already known from this prior art each have a busbar system which contains at least one outdoor busbar as well as branch circuit switch bays which are each provided with gas-insulated branch circuit switchgear and with an outgoer which leads to the open air. Based on conventional technology, the gas-insulated switchgear arrangements are encapsulated on a single-phase or three-phase basis so that these arrangements have high availability in comparison to correspondingly configured outdoor switchgear arrangements. However, a lengthy down time must be planned for maintenance on one of these switchgear arrangements, quite in contrast to a comparable outdoor switchgear arrangement in which, although maintenance work must admittedly be carried out more frequently, a single maintenance period requires only a short time period, however, since defective outdoor components can be replaced relatively quickly.

DESCRIPTION OF THE INVENTION

The invention, as it is defined in the patent claims, achieves the object of specifying a substation of the type mentioned initially, which can be produced at low cost and is nevertheless distinguished by high availability.

In the substation according to the invention, an installation module which allows lateral removal of at least one of the two switchgear modules is arranged between a disconnector module and a circuit breaker module in the encapsulated switchgear arrangement. A highly stressed component of the encapsulated switchgear arrangement, that is to say the disconnector module or the circuit breaker module, can thus be removed by lateral removal from the substation without having to change the position of the other component. Once the removed component has been replaced, the complete availability of the substation can be reproduced quickly and at low cost within a few hours. This therefore avoids long down times—as in the case of conventionally designed gas-insulated switchgear arrangements. Since individual components can be removed selectively from the switchgear arrangement, which is typically connected to a branch circuit, there is therefore generally no need either to switch off any other branch circuit in the relevant switch bay, or any busbar which relates to the entire substation. All safety separations can be complied with by means of suitably arranged grounding apparatuses. There is no need for any additional protective measures for replacement of the component to be replaced.

If the substation according to the invention has at least two outdoor busbars as well as an encapsulated circuit arrangement which is in the form of a cross-coupling and in which a first disconnector module is connected to a first of the two busbars and a second disconnector module, which is connected to the circuit breaker module, is connected to the second busbar, then it is recommended that a second installation module, which allows lateral removal of the circuit breaker, be arranged between the second disconnector module and the circuit breaker module. The use of two installation modules allows the circuit breaker module to be removed laterally without any shifting, at right angles to the removal direction.

If the substation according to the invention contains at least two outdoor busbars and at least one 1½ switch configuration encapsulated switchgear arrangement with three circuit breaker modules and two branch circuits, in which a first and a second disconnector module are designed in the form of a T whose two arms each have one isolation point and whose leg contains a node which can be connected to one of the two branch circuits, then one of the three circuit breaker modules should be connected via a first installation module to a first arm of the T of the first disconnector module, and should be connected via a second installation module to the first arm of the T of the second disconnector module. Selective removal of this circuit breaker module is then ensured in the comparatively complex 1½ switchgear arrangement. The selectivity and thus the availability as well are increased if the second arm of the T of the first disconnector module is connected via a third installation module to the second of the three circuit breaker modules, and the second arm of the T of the second disconnector module is connected via a fourth installation module to the third circuit breaker module, or if, in addition, a fifth and a sixth installation module as well as a third disconnector module (which is connected to the first of the two busbars) and a fourth disconnector module (which is connected to the second busbar) are provided, and if the fifth installation module is arranged between the second circuit breaker module and the third disconnector module, and the sixth installation module is arranged between the third circuit breaker module and the fourth disconnector module.

In a further embodiment of the substation according to the invention having at least two outdoor busbars and having at least two switchgear arrangements which are arranged in different switch bays to one another and each of which contains at least one branch circuit, the switchgear arrangements should have different switchgear configurations, and at least one of the switchgear configurations should be encapsulated and gas-insulated. Thanks to the space-saving design of the encapsulated, gas-insulated switchgear arrangement, existing outdoor substations can thus easily be converted, and existing branch circuits can be connected by means of differently designed and/or differently arranged switchgear arrangements to the busbars, which ensure particularly high availability or only less high availability depending on the requirement.

In this case, the encapsulated switchgear arrangement is advantageously in the form of a double busbar or 1½-switch configuration. If necessary, a further encapsulated switchgear arrangement can also be provided. The first of these two encapsulated switchgear arrangements can then be designed using a 1½ switch configuration, and the second can be designed using the double busbar configuration or using a 1½ switch configuration in particular in a longitudinal or U form, which differs from the first encapsulated switchgear arrangement.

Instead of an outdoor busbar, a ring configuration can also be provided in the high-voltage substation according to the invention. This ring configuration should be suitably encapsulated in the encapsulated switchgear arrangement. In order to improve the availability of this embodiment of the substation, it is recommended that the encapsulated switchgear arrangement be designed on a ring/crossed basis. In a development of these substations, the encapsulated switchgear arrangement can also contain a double busbar branch circuit. On-load switching is then possible in this branch circuit, provided that the associated connecting switch in the ring configuration is closed.

DESCRIPTION OF THE DRAWINGS

The invention will be explained in the following text with reference to exemplary embodiments. In the figures:

FIG. 1 shows a circuit diagram of one pole of a three-phase high-voltage substation according to the invention having an outdoor double busbar and having three large branch circuit sections and a cross-coupling section, each containing an encapsulated, gas-insulated, arrangement of switchgear modules, FIG. 2 shows a view of one pole of the cross-coupling section of the substation shown in FIG. 1, FIG. 3 shows a view of the cross-coupling section as shown in FIG. 2 during removal of a component from the encapsulated switchgear arrangement.

WAYS TO IMPLEMENT THE INVENTION

Figure 4:
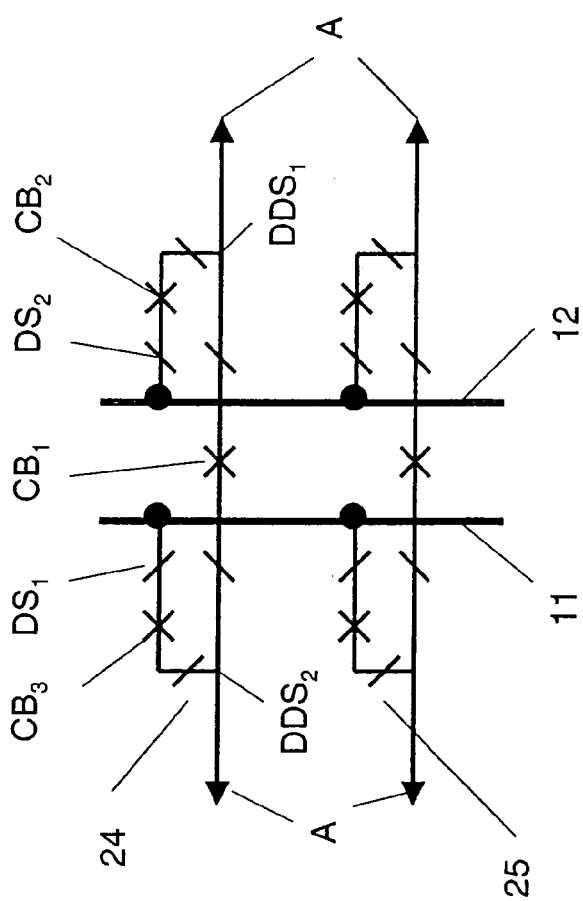
FIG. 4 shows a circuit diagram of one pole of a three-phase embodiment of the substation according to the invention having an outdoor double busbar as well as two switch bays, in which the encapsulated switchgear arrangement is in each case in the form of a 1½ switch configuration.

The same reference symbols also denote parts having the same effect in all of the figures. The embodiment of the substation according to the invention as illustrated in FIGS. 1 to 3 has the circuit diagram shown in FIG. 1 and contains two outdoor busbars 11 and 12, which are routed at right angles to the plane of the drawing in FIGS. 2 and 3, as well as four switch bays, three of which are in each case in the form of branch circuit sections 21, 22 and 23, and one of which is a cross-coupling section 20. All the switch bays have an encapsulated and gas-insulated switchgear arrangement which is connected between the two busbars 11 and 12. One switchgear arrangement, which is contained in the cross-coupling section 20 and is annotated with the reference symbol 30, is illustrated in FIGS. 2 and 3. As can be seen from FIGS. 2 and 3, the switchgear arrangement 30 is, as can be seen, modular and contains an encapsulation module CB in the form of a circuit breaker, two encapsulation modules DS each in the form of disconnectors, as well as two installation modules MM, each of which are arranged between one of the disconnector modules DS and the circuit breaker module CB, thus ensuring the electrical connection between the two power connections of the circuit breaker CB and the two disconnectors DS.

The same arrangement is also achieved for the intermediate switch arranged in the center in the 1½ switch configuration. A 1½ switch configuration such as this is also shown later, in FIGS. 4 and 5. The intermediate switch which corresponds to the switch CB is annotated CB$_1$ there.

Figure 5:
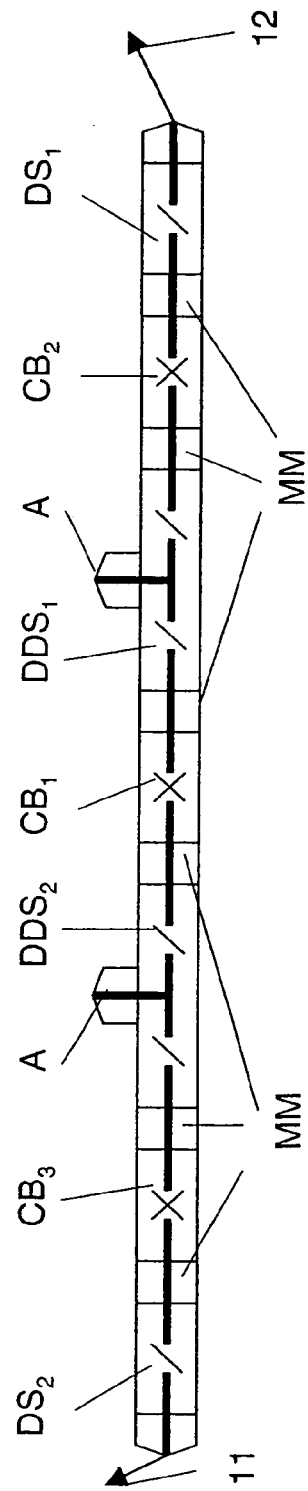
FIG. 5 shows a schematic illustration of the modules contained in the encapsulated switchgear arrangement in the substation shown in FIG. 4.

In the cross-coupling section shown in FIGS. 2 and 3, power connections of the disconnectors DS which are averted from the circuit breaker CB are each routed via an outdoor bushing, which is not annotated, to one of the two busbars 11 or 12, corresponding to two outgoers A in the 1½ switch configuration shown in FIGS. 4 and 5. A tubular connecting module TU is also arranged between the disconnector DS, which is connected to the busbar 11, and one of the two installation modules MM, and compensates for the large geometric dimensions of the switch bay 20, which are governed by the isolation separations in air. As can be seen, the switchgear arrangement contains additional modules CT, ES, VT and SA which, in the same sequence, carry out the functions of current transformation, grounding, voltage transformation and surge arresting.

The installation modules MM correspond to the lateral removal elements ELK VQ which are known from the technology of gas-insulated substation technology and are described, for example, in the document No. CH-HS 1215 87 D "SF6-Gas-isolierte Schaltanlagen (GIS) Type ELK" ["SF6-gas-insulated substations], from BBC Brown Boveri AG Hochspannungstechnik, CH-5401 Baden, Switzerland, 15, which are installed in gas-insulated substations between individual sections of the busbar, long busbar connections and in the case of transformer and cable connections and allow substation parts to be removed by the capability to move the encapsulation and the conductor tube axially without having to remove adjacent sections.

The installation module MM has a closed gas area which is filled with insulating gas. In order to remove a damaged component from the switchgear arrangement 30, for example the circuit breaker module CB, the two installation modules MM are connected to ground potential with the disconnectors DS open and the grounding switches ES closed. The installation modules MM can now be moved axially and removed from the substation, once the insulating gas has been pumped out. The damaged component CB can thus be removed from the substation by lateral movement and can be replaced by a new component without having to change the position of the other components. Once the new component has been installed and the installation modules MM have been installed, the full availability of the substation can be reproduced quickly and at low cost. Depending on the arrangement of the component and the configuration of the installation modules MM, the lateral removal process can be carried out even with a single installation module.

As already described above, the substation as shown in FIGS. 4 and 5 has two outdoor busbars 11 and 12 as well as two switch bays 24 and 25 which each contain an encapsulated 1½ switch gear arrangement with three circuit breaker modules $CB_1$, $CB_2$ and $CB_3$, and two branch circuits A. One of these two encapsulated switchgear arrangements is illustrated schematically in FIG. 5. This arrangement contains two disconnector modules $DDS_1$ and $DDS_2$, which are each connected via an installation module MM to each one of the two connections of a circuit breaker $CB_1$ which is provided in the middle of the arrangement. The two disconnector modules $DDS_1$ and $DDS_2$ are each in the form of a T. As can be seen, the two arms of the T each have an isolation point. The leg of the T contains a node which is connected to one of the two branch circuits A. The circuit breaker $CB_1$ which is arranged in the middle is connected via a first installation module MM to the arm of the T of the disconnector module $DDS_1$ which points to the left, and is connected via a second installation module MM to the arm of the disconnector module $DDS_2$ which points to the right. The arm of the T of the disconnector module $DDS_1$ which points to the right is connected via a third installation module MM to the circuit breaker module $CB_2$ while, in contrast, the arm T of the second disconnector module $DDS_2$ which points to the left is connected via a fourth installation module MM to the circuit breaker module $CB_3$. In addition, a fifth and a sixth installation module MM as well as an isolation module $DS_1$ which is connected to the busbar 12 and a fourth disconnector module $DS_2$ which is connected to the busbar 11 are provided, and the fifth installation module is arranged between the circuit breaker module $CB_2$ and the disconnector module $DS_1$, while the sixth installation module is arranged between the circuit breaker module $CB_3$ and the disconnector module $DS_2$.

Depending on the configuration of the substation, fewer than six installation modules MM are also required, particularly when axial removal is possible. Despite the comparatively complicated design of the encapsulated switchgear arrangement, all of the components of this substation which are susceptible to defects can therefore be maintained or replaced selectively without having to pay attention to other components of the switchgear arrangement during the maintenance process, and the full availability of the substation can thus be achieved again in a significantly short time and with little installation effort.

Figure 6:
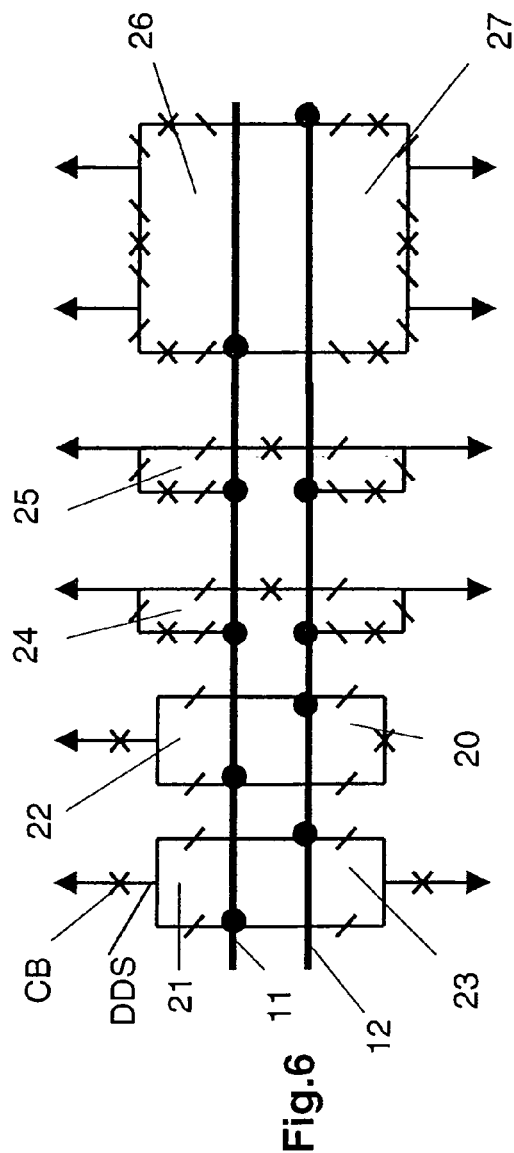
FIG. 6 shows a circuit diagram of one pole of a three-phase embodiment of the substation according to the invention having an outdoor double busbar and having a cross-coupling section, two branch circuit sections with a double busbar configuration, and four branch circuit sections in a 1½ switch configuration.
Figure 7:
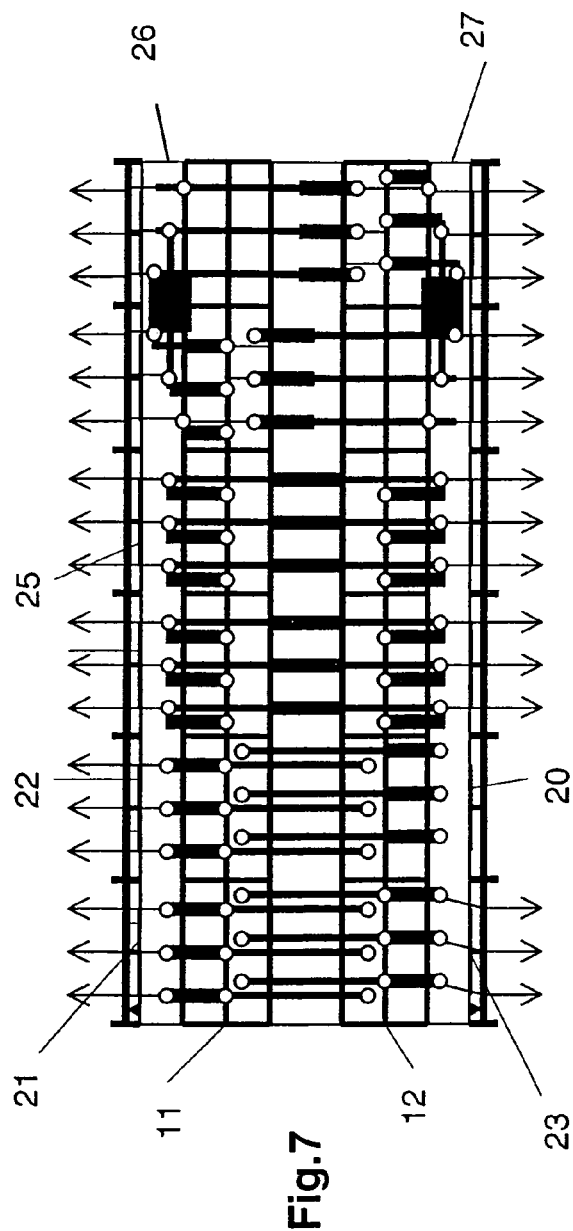
FIG. 7 shows a plan view of a substation layout, three poles of which are illustrated, as shown in FIG. 6.

The substation shown in FIGS. 6 and 7 has two outdoor busbars 11 and 12 and eight switch bays 20 to 27, each having an encapsulated switchgear arrangement. The encapsulated switchgear arrangements in the switch bays 21, 22 and 23 are each based on a double busbar configuration, that is to say they have a circuit breaker module CB which is connected to a branch circuit A and to a disconnector module DDS in a T configuration, with those arms of the T which each contain an isolation point each being connected to a respective one of the two busbars 1 and 12, and the leg of the T being connected to the circuit breaker module CB. The switch bays 24 to 27 each contain encapsulated switchgear arrangements in a 1½ switch configuration, which have a longitudinal configuration in the case of the switch bays 24 and 25, and a U configuration in the case of the switch bays 26 and 27. The encapsulated switchgear arrangement in the switch bay 20 is in the form of a cross-coupling. Fundamentally, a cross-coupling such as this is not absolutely essential, since the function of the cross-coupling can be carried out by the 1½ switch configuration in the branch circuits 24 to 27.

Since this substation contains differently configured encapsulated switchgear arrangements, the substation has different availabilities for the branch circuit sections associated with the different switchgear arrangements, with the availability of the switch bays 24 to 27 being higher than that of the switch bays 21 to 23. In comparison to a substation according to the prior art, in which the branch circuits have identical encapsulated switchgear arrangements, the substation can thus be manufactured and maintained at a considerably lower cost while ensuring optimum selective availability.

Figure 8:
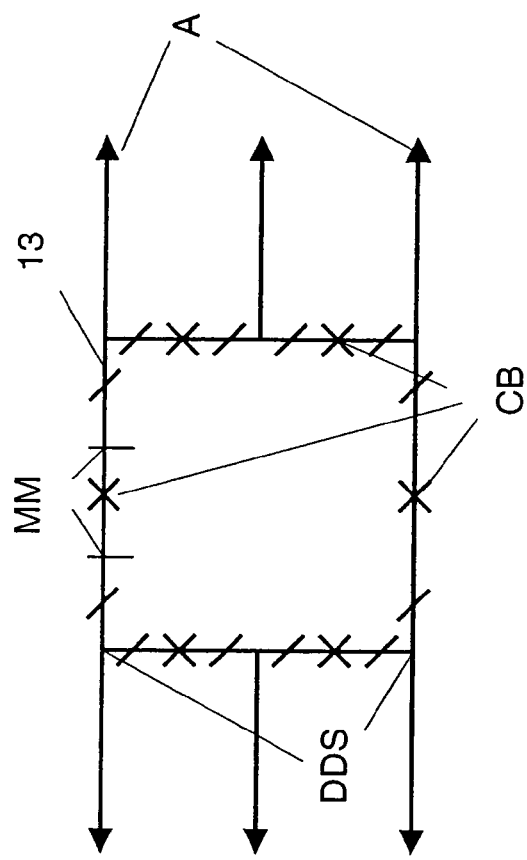
FIG. 8 shows a circuit diagram of one pole of a three-phase embodiment of the substation according to the invention based on a ring configuration.
Figure 9:
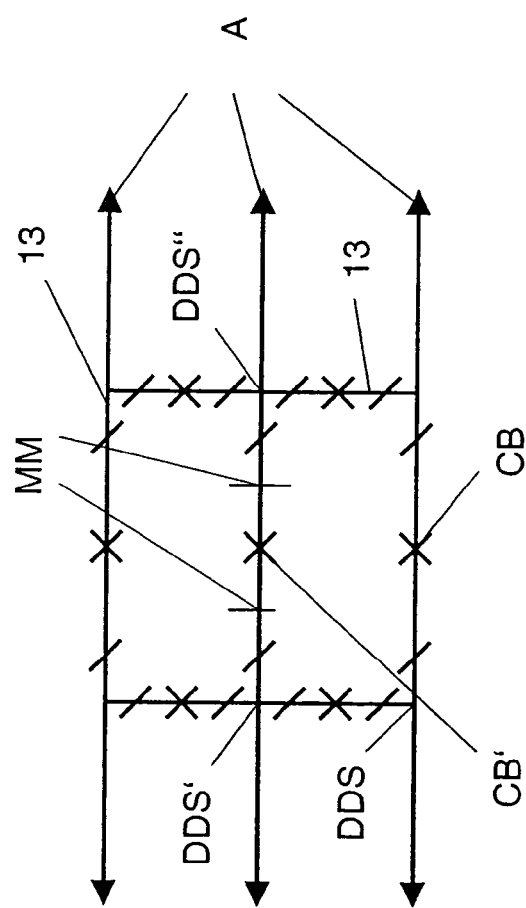
FIG. 9 shows a circuit diagram of one pole of a three-phase embodiment of the substation according to the invention with a double busbar based on a ring/cross configuration and FIG. 10 shows a circuit diagram of one pole for a three-phase embodiment of the substation according to the invention based on a ring configuration with an attached double busbar branch circuit.
Figure 10:
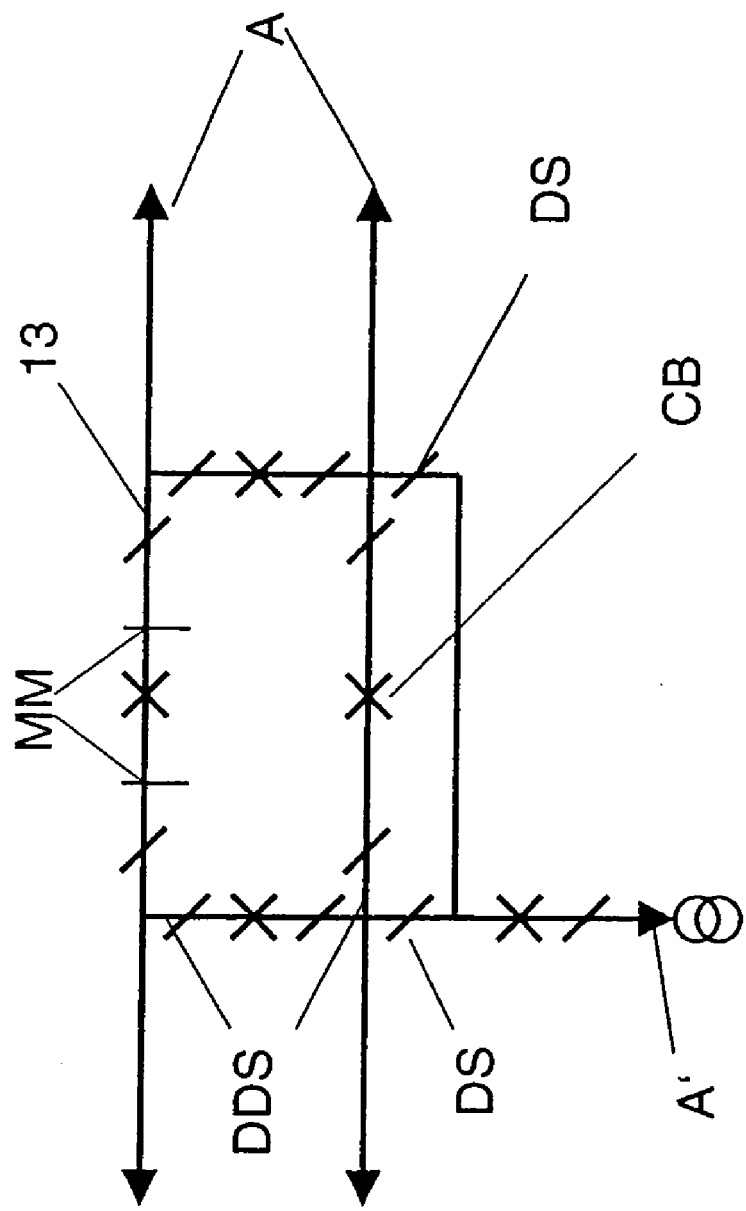

The three substations shown in FIGS. 8 to 10 have an encapsulated ring configuration 13 without any explicit busbar instead of an outdoor busbar, which ring configuration 13 is integrated in the encapsulated switchgear arrangement and has successive circuit breaker modules CB and disconnector modules DDS alternately in the ring. The disconnector modules DDS are based on a T configuration, with the foot of the T containing a node which is connected to the branch circuit A. An installation module MM is arranged between each of the adjacent modules, which are electrically conductively connected to one another (illustrated only for the circuit breaker module CB positioned at the top in FIGS. 8 and 10).

In the case of the substation shown in FIG. 9, whose availability is higher than that of the substation shown in FIG. 8, the encapsulated switchgear arrangement is based on a ring/cross configuration. In addition, it has a further circuit breaker module CB' which is connected via two installation modules MM to two disconnector modules DDS' and DDS", which are diagonally opposite one another in the ring in a cross configuration with three isolation points and a node which is connected to the branch circuit A.

FIG. 10 shows an embodiment of the substation according to the invention which has an encapsulated ring configuration 13, to which a double busbar branch circuit A' is attached for a feeder, for example a transformer, which is not shown. In this case, the two disconnector modules DS for the branch circuit, which are normally connected to the double busbar, access the disconnector modules DDS in the ring configuration 13. On-load switching is possible when the connecting switch CB (which in this case acts as a coupling switch) in the ring configuration 13 is closed.

LIST OF REFERENCE SYMBOLS 11, 12 Busbars
13 Ring busbar
20 Switch bay for cross-coupling
21 to 27 Switch bays for branch circuits
30 Encapsulated switchgear arrangement
CB, $CB_1$, $CB_2$, $CB_3$ Circuit breaker modules
DS, $DS_1$, $DS_2$ Disconnector modules
DDS, $DDS_1$, $DDS_2$,
DDS', DDS"
MM Installation module
A, A' Branch circuits
ES Grounding module
CT Current transformer module
VT Voltage transformer module
SA Surge arrester module

The invention claimed is:

1. A high-voltage substation having at least one outdoor busbar, at least two switch bays which can be connected to the busbar, and at least one encapsulated, switchgear arrangement arranged in one of the switch bays and comprising switchgear modules filled with an insulating gas, which switchgear arrangement includes switchgear modules as follows:
   at least one first disconnector module;
   at least one first circuit breaker module; and
   at least one first installation module which is arranged between the first disconnector module and the first circuit breaker module, which after removing the insulating gas can be moved axially between the first disconnector module and the first circuit breaker module and which after axial movement allows lateral movement of at least one of the two switchgear modules.

2. The high-voltage substation as claimed in claim 1 having:
   at least two outdoor busbars, wherein the switchgear arrangement is in the form of a cross-coupling and wherein the first disconnector module is connected to a first of the two busbars, and
   a second disconnector module, which is connected to the first circuit breaker module, is connected to the second busbar, and
   a second installation module, which allows lateral removal of the first circuit breaker module, is arranged between the second disconnector module and the first circuit breaker module.

3. The high-voltage substation as claimed in claim 2 having at least two outdoor busbars and having a 1½-switch configuration encapsulated switchgear arrangement with three circuit breaker modules and two branch circuits, in which the first and a second disconnector modules are configured as a T whose two arms each have one isolation point and whose leg contains a node which can be connected to one of the two branch circuits,
   wherein the first circuit breaker module is connected via the first installation module to a first arm of the T of the first disconnector module, and is connected via a second installation module to the first arm of the T of the second disconnector module.

4. The high-voltage substation as claimed in claim 3, wherein the second arm of the T of the first disconnector module is connected via a third installation module (MM) to the second of the three circuit breaker modules, and the second arm of the T of the second disconnector module is connected via a fourth installation module to the third circuit breaker module.

5. The high-voltage substation as claimed in claim 4, wherein a fifth and sixth installation module as well as third disconnector module and a fourth disconnector module which is connected to the second busbar, are provided, and wherein the fifth installation module is arranged between the second circuit breaker module and the third disconnector modules, and the sixth installation module is arranged between the third circuit breaker module and the fourth disconnector module.

6. A high-voltage substation, as claimed in claim 1, having at least two outdoor busbars and having at least two switchgear arrangements which are arranged in switch bays which branch off from one another and each contain at least one branch circuit, wherein the switchgear arrangements have different switchgear configurations, and wherein at least a first of the switchgear configurations is encapsulated and gas-insulated.

7. The high-voltage substation as claimed in claim 6, wherein the first encapsulated switchgear arrangement has a double busbar or 1½ switch configuration.

8. The high-voltage substation as claimed in claim 7, wherein a second encapsulated switchgear arrangement is provided, wherein the first encapsulated switchgear arrangement has a 1½ switch configuration and the second encapsulated switchgear arrangement has a double busbar configuration, which differs from the first encapsulated switchgear arrangement.

9. The high-voltage substation as claimed in claim 1, in which the busbar is configured as a ring configuration, wherein the ring configuration is encapsulated and is contained in the encapsulated switchgear arrangement.

10. The high-voltage substation as claimed in claim 9, wherein the encapsulated switchgear arrangement is designed on a ring/crossed basis.

11. The high-voltage substation as claimed in claim 9, wherein the encapsulated switchgear arrangement has a double busbar branch circuit.

12. The high-voltage substation as claimed in claim 7, wherein a second encapsulated switchgear arrangement is provided, wherein the first encapsulated switchgear arrangement has a 1½ switch configuration and the second encapsulated switchgear arrangement has a 1½ switch configuration which differs from the first encapsulated switchgear arrangement.

13. The high-voltage substation as claimed in claim 12, wherein the second encapsulated switchgear arrangement has a longitudinal form.

14. The high-voltage substation as claimed in claim 12, wherein the second encapsulated switchgear arrangement has a U form.

* * * * *